United States Patent

Shigyo et al.

[11] Patent Number: 4,941,114
[45] Date of Patent: Jul. 10, 1990

[54] TRIANGULAR MESH GENERATION METHOD

[75] Inventors: Naoyuki Shigyo; Koichi Sato, both of Yokohama, Japan

[73] Assignee: Kabushiki Kaisha Toshiba, Kawasaki, Japan

[21] Appl. No.: 169,480

[22] Filed: Mar. 17, 1988

[30] Foreign Application Priority Data

Mar. 26, 1987 [JP] Japan ................. 62-72120

[51] Int. Cl.$^5$ ............... G06F 15/60; G06F 15/328; G06F 7/64
[52] U.S. Cl. ................................. 364/578; 364/518
[58] Field of Search ................. 364/518–522, 364/510, 735, 578

[56] References Cited

U.S. PATENT DOCUMENTS 4,742,473 5/1988 Shugar et al. ............... 364/518
4,797,842 1/1989 Nackman et al. ............ 364/578

FOREIGN PATENT DOCUMENTS 888119 12/1981 U.S.S.R. .................... 364/735
926667 5/1982 U.S.S.R. .................... 364/510
1104513 7/1984 U.S.S.R. .................... 364/735

OTHER PUBLICATIONS

Panationi: Algorithm for Solution of Partial Differnetial Equations by Means of a Finite Difference Nonregular Scheme. IBM Technical Disclosure Bulletin, vol. 20, No. 10, Mar. 1978, pp. 3969–3971.

Shephard: Finite Element Modeling Within an Integrated Modeling Environment: Part I–Mesh Generation. Engineering and Computer-Springer 1985, pp 61–70.

Inter. J. Num. Math. Eng. vol. 15, pp. 1813–1822; E. A. Sadek; 1980.

Trans. Inform. Processing Society Japan, pp. 183–190; Y. Yamashita et al; 1980.

*Primary Examiner*—Felix D. Gruber
*Attorney, Agent, or Firm*—Oblon, Spivak, McClelland, Maier & Neustadt

[57] ABSTRACT

A triangular mesh generation apparatus has a feedback rate calculation unit and a triangular mesh generation unit. The feedback rate calculation unit obtains feedback rate $r_i$ for a given node i from the following relationship:

$$r_i = \left( \frac{(a+b)/2}{(1/N) \sum_{k=1}^{N} d_k} \right)^{-\alpha}$$

where $d_i$ is a distance between the respective adjacent nodes, a is a distance between nodes i−1 and i, b is a distance between nodes i and i+1, and $\alpha > 0$. The triangular ratio generation unit generates triangular meshes as follows:

(1) When $\theta \leq 90°$, a triangular element is generated by node i and its adjacent nodes i−1 and i+1.
(2) When $90° < \theta < 150°$, node j1' is obtained on a line dividing internal boundary angle $\theta$ into two equal parts at distance $11' = r_i \times 11$ from node i. Then, two triangular elements are respectively generated by nodes i, i−1, and j1', and nodes i, i+1, and j1'. Here, 11 =

$$\sqrt{a \times b}.$$

(3) When $150° < \theta < 180°$, node j2' is obtained on one of lines dividing internal boundary angle $\theta$ into three equal parts at distance $12' = r_i \times 12$, and node j3' is on the other line at distance $13' = r_i \times 13$ from node i. Then, three triangular elements are respectively generated by nodes i, i−1, and j2', i, j2', and j3', and nodes i, i+1, and j3'. Here, $12 = \sqrt[3]{a \times b^2}$ and $13 = \sqrt[3]{a \times b^2}$.

13 Claims, 5 Drawing Sheets

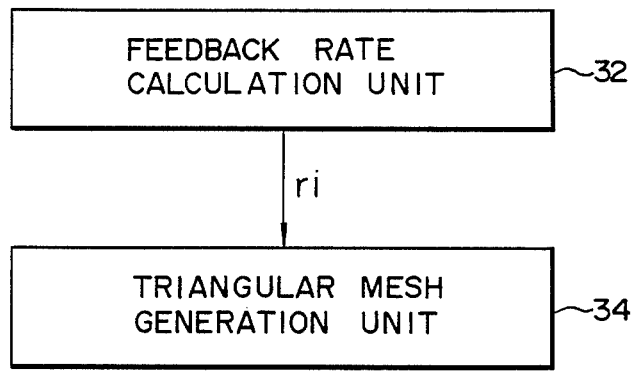
F I G. 3
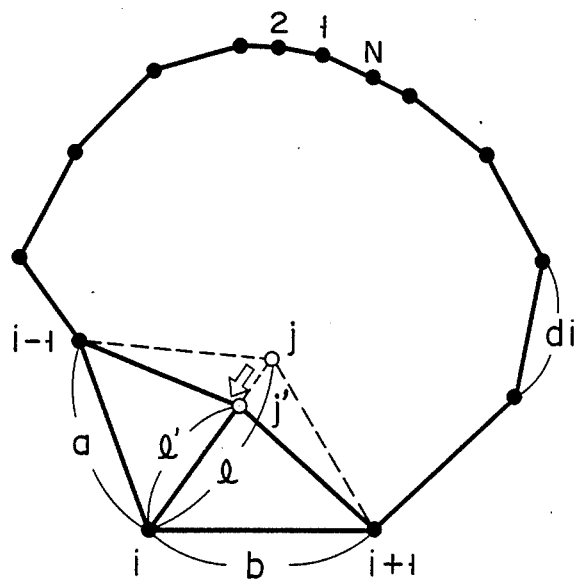
F I G. 4

TRIANGULAR MESH GENERATION METHOD

BACKGROUND OF THE INVENTION

1. Field of the Invention.

The present invention relates to an apparatus for generating a triangular mesh used to discretize an equation in the numerical analysis of an equation.

2. Description of the related art.

In a conventional scheme, when a numerical analysis e.g., a thermal conductance equation, is to be performed, a domain to be analyzed is discretized by the finite-difference method or finite-element method, thereby obtaining a temperature distribution or the like. When a domain to be analyzed is a two-dimensional space, an equation is discretized by dicretized by dividing the domain using a triangular or rectangular mesh. In order to obtain a high-precision solution with respect to a domain of complex shape, the domain is preferably divided using a triangular mesh, especially preferably, regular triangular mesh. Precision and calculation speed of a solution in numerical analysis heavily depend on such a mesh structure.

A conventional triangular mesh generation apparatus is described in Edward A. Sader, "A Scheme for the Automatic Generation of Triangular Finite Elements", International Journal For Numerical Method In Engineering, vol. 15, 1980, pp. 1813–1822. According to this method, new nodes are sequentially obtained inside a domain surrounded by string nodes, and a triangular element is generated by three nodes. The rules of generation can be divided into the following three cases depending on internal boundary angle $\theta$ of node i as shown in FIG. 1.

$$\theta \leq 90° \tag{1}$$

As shown in FIG. 2A, a triangular element is generated by node i and its adjacent nodes $i-1$ and $i+1$ without generating a new node.

$$90° < \theta \leq 150° \tag{2}$$

As shown in FIG. 2B, node j1 is obtained on a line dividing angle $\theta$ into two equal parts at distance l1 from node i. Then, two triangular elements are respectively generated by nodes i, $i-1$, and j1, and nodes i, $i+1$, and j1.

In this case, $l1 = \sqrt{d_{i-1} \times d_i d_{i-1}}$ is the distance between nodes i and $i-1$, and $d_i$ is the distance between nodes i and $i+1$. Since the two triangular elements are similar to each other, $l1/d_{i-1} = d_i/l1$.

$$150° < \theta \leq 180° \tag{3}$$

As shown in FIG. 2C, node j2 is obtained on one of two lines dividing angle $\theta$ into three equal parts at distance l2 from node i, and node j3 is obtained on the other line at distance l3 from node i. Then, three triangular elements are respectively generated by nodes i, $i-1$, and j2, nodes i, j2, and j3, and nodes i, $i+1$, and j3.

$$\text{Distance } l_2 = \sqrt[3]{d_{i-1}^2 \times d_i}$$

-continued $$\text{Distance } l_3 = \sqrt[3]{d_{i-1} \times d_i^2}$$

Similarly, in this case, since the three triangular elements are similar to each other, the following relation is obtained:

$$l2/d_{i-1} = l3/l2 = d_i/l3$$

Upon generation of the triangular element, node i is removed from the string nodes defining a generation domain, and nodes j1, j2, and j3 are newly added to the string nodes. Then, mesh generation processing is repeatedly performed with respect to each node until the above-described rules are no longer satisfied.

However, the nodes of the triangular mesh generated by this method heavily depend on the initial intervals of string nodes which define a generation domain. If the initial intervals of the string nodes are substantially uniform, substantially regular triangles are generated. If the intervals greatly vary depending on the nodes, triangular elements having nonuniform sizes may be generated. In this case, the obtuse triangular elements are generated in addition to the substantial regular triangles.

If a domain to be analyzed is discretized by a mesh including an obtuse triangular element, a discretization error is increased. In this case, if a problem having a convection is to be analyzed, the solution does not converge and precision of the solution is greatly degraded. In another case, it may take a very long period of time for the solution to converge. It is most preferable to generate regular triangular elements (their sizes may vary so as to meet the requirements of discretization).

Another conventional scheme is described in Hideo Yamashita, and Eihachiro Nakamae, "An Automatic Triangular Mesh Generation for Finite Element Analysis", Transaction of the Information Processing Society of Japan, vol. 21, No. 3, 1980, May, pp. 183–190. This scheme is a scheme for relaxing the triangular mesh by moving a node for constituting a mesh element to the center of gravity of surrounding nodes upon generation of the triangular mesh. However, in some cases, it may not be preferable to move the node to the center of gravity depending on the positions of the surrounding nodes. For example, when the surrounding nodes are arranged on a single line except for one node, the center of gravity comes close to the line, resulting in many obtuse triangular elements.

SUMMARY OF THE INVENTION

It is an object of the present invention to provide a triangular mesh generation method which can decrease the number of obtuse triangular elements and generate triangular elements having uniform shapes so as to enable high-precision and high-speed numerical analysis.

A triangular mesh generation method according to the present invention comprises a feedback ratio calculation unit for calculating a feedback rate with respect to a given node of string nodes surrounding a generation domain in accordance with the ratio of a mean value of distances between the given node and two nodes adjacent to the given node to a mean value of distances between adjacent nodes, obtained for all the string nodes; and a triangular element generation unit for obtaining a new node in accordance with the product of the distances between the given node and the two adjacent nodes and the feedback rate, thereby generating a triangular element by the given node, the two adjacent nodes, and the new node.

Another triangular mesh generation method according to the present invention comprises a triangular mesh generation unit for obtaining a new node in accordance with an internal boundary angle of each node and distances to adjacent nodes, and generating a triangular element by the three nodes; and a mesh relaxation unit for correcting coordinates of a given node generated by the triangular mesh generation unit in accordance with coordinates of surrounding nodes, and distances between the given node and the surrounding nodes.

BRIEF DESCRIPTION OF THE DRAWINGS

FIG. 3 is a block diagram of a triangular mesh generation method according to a first embodiment of the present invention;

FIG. 4 is a view for explaining a principle of generation of triangular elements according to the first embodiment;

DETAILED DESCRIPTION OF THE PREFERRED EMBODIMENTS

An embodiment of a triangular mesh generation method according to the present invention will be described below with reference to the accompanying drawings. FIG. 3 is a block diagram showing a first embodiment. This embodiment comprises feedback rate calculation unit 32 for obtaining a feedback rate for every node, and triangular mesh generation unit 34 for obtaining a triangular element (a new node) of a triangular mesh using feedback rate $r_i$.

An operation will now be described with reference to a case wherein triangular elements are generated inside a domain surrounded by topography string nodes consisting of N nodes, as shown in FIG. 4. First, feedback rate calculation unit 32 selects a node having a minimum internal boundary angle among the N nodes. This means that a mesh generation domain comes closer to a circle. In this case, assume that internal boundary angle $\theta$ of node i is minimum.

In order to discretize the domain surrounded by the topography string nodes by a mesh having triangular elements of uniform size, feedback rate calculation unit 32 determines the length of an edge of a triangular element using topography string nodes, i.e., the ratio of a mean value of the distances between node i and its two adjacent nodes to a mean value of the distances between adjacent nodes obtained for all the string nodes. In this case, feedback rate $r_i$ with respect to node i is represented by $$r_i = \left( \frac{(d_{i-1} + d_i)/2}{(1/N) \sum_{k=1}^{N} d_k} \right)^{-\alpha} \quad (1)$$

where $d_k$ is a distance between the respective two adjacent nodes, $d_{i-1}$ is a distance between nodes $i-1$ and $i$, $d_i$ is a distance between nodes $i$ and $i+1$, and $\alpha$(parameter)$>0$ and is set to be, e.g., 0.1.

Figure 1:
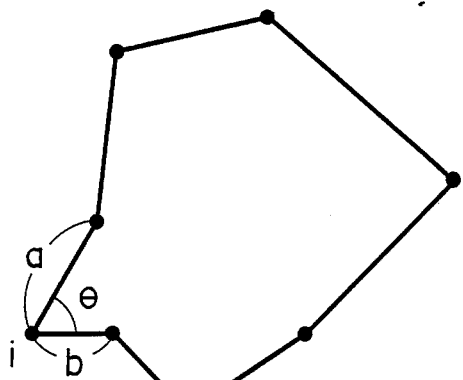
FIG. 1 is a view of string nodes defining a domain in which triangular elements are generated.
Figure 2A:
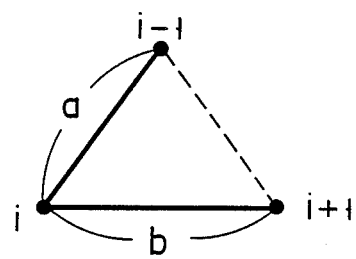
FIGS. 2A, 2B, and 2C are views illustrating rules for generating triangular elements of a conventional triangular mesh generation method.

Then, triangular mesh generation unit 34 corrects the obtained length of the edge of the triangular element using feedback rate $r_i$ in the following manner, as described with reference to FIGS. 2A to 2C.

(1) When $\theta \leq 90°$, a triangular element is generated by node i and its adjacent nodes $i-1$ and $i+1$.

(2) When $90° < \theta < 150°$, node j1' is obtained on a line dividing internal boundary angle $\theta$ into two equal parts at distance $l1' = r_i \times l1$ from node i. Then, two triangular elements are respectively generated by nodes i, $i-1$, and j1', and nodes i, $i+1$, and j1'.

Figure 2B:
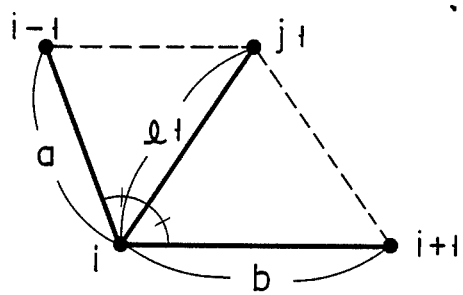

In this case, similar to the case in FIG. 2B, $l1 = \sqrt{d_{i-1} \times d_i}$.

If the mean value ($=(d_{i-1}+d_i)/2$) of the distances between node i and its adjacent nodes $i-1$ and $i+1$ larger than mean value $$\left( = (1/N) \sum_{k=1}^{N} d_k \right)$$

of the distances between adjacent nodes calculated for all the N string nodes, then $r_i < 1$, and hence the distance between node i and a new dot becomes smaller than that in the conventional scheme. On the contrary, if a mean value of the distances between node i and its adjacent nodes $i-1$ and $i+1$ is smaller than a mean value of the distances of adjacent nodes calculated for all the N string nodes, the distance between node i and a new dot becomes larger than that in the conventional scheme. For this reason, the sizes of triangular elements are averaged, and triangular elements having uniform sizes corresponding to the mean value of the distances between adjacent nodes calculated for all the string nodes defining the generation domain can be generated. Thus, the generated triangular elements come closer to the regular triangles.

(3) When $150° < \theta \leq 180°$, node j1 is obtained on one of lines dividing internal boundary angle $\theta$ into three equal parts at distance $l2' = r_i \times l2$, and node j1'' is obtained on the other line at distance $l3' = r_i \times l3$ from node i. Then, three triangular elements are respectively generated by nodes i, $i-1$, and j2', nodes i, j2', and j3', and nodes i, $i+1$, and j3'.

Figure 2C:
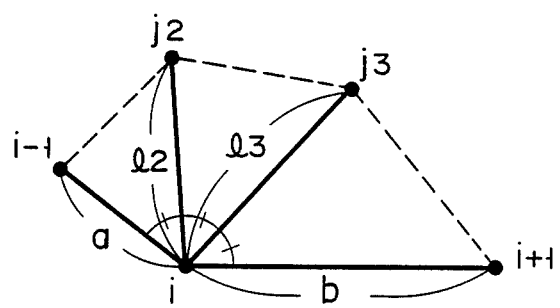

In this case, similar to the case in FIG. 2C, $l2 = \sqrt[3]{d_{i-1}^2 \times d_i}$ and $l3 = \sqrt[3]{d_{i-1} \times d_i^2}$.

Similar to the case $d_i$ (2), the sizes of triangular elements are averaged, and triangular elements having uniform sizes corresponding to the mean value of the distances between adjacent nodes calculated for all the string nodes can be generated. Therefore, the generated triangular elements come closer to the regular triangles.

Upon generation of the triangular element, the string nodes are updated, i.e., node i is removed from the string nodes defining the generation domain, and nodes j1', j2', and j3' are newly added to the string nodes. Subsequently, the above-described processing is repeatedly performed, and mesh generation processing is repeated with respect to each node.

As described above, according to the first embodiment, the length of an edge of a triangular element is determined using the ratio of a mean value of the distances between a given node and its two adjacent nodes to a mean value of the distances between all the adjacent string nodes. As a result, the sizes of triangular elements can be made uniform, and hence the number of obtuse triangular elements can be greatly decreased.

Figure 5A:
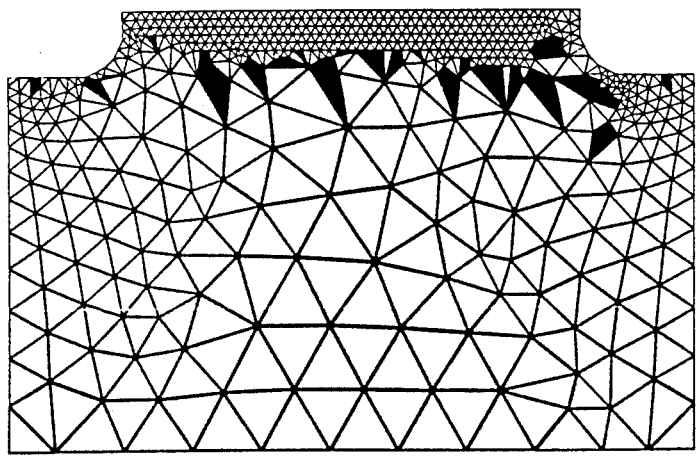
FIGS. 5A, 5B, and 5C are views of shapes of generated mesh, which show the effects of the present invention.
Figure 5B:
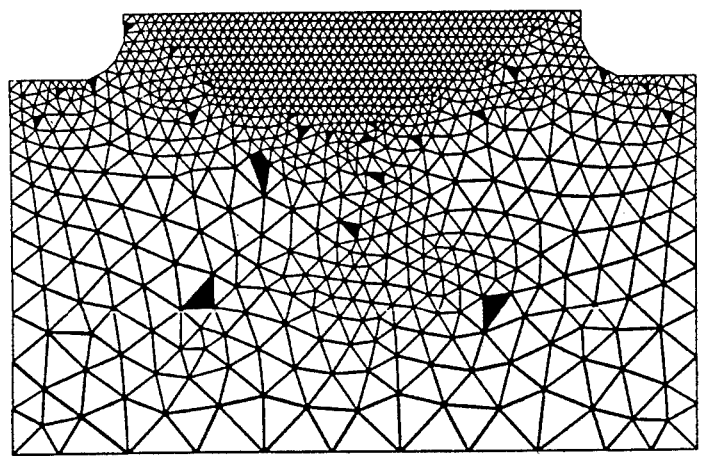

FIGS. 5A and 5B show the effects when correction is performed using the feedback rate. Referring to FIGS. 5A and 5B, obtuse triangular elements are painted in black. FIG. 5A shows a case wherein the feedback rate is set to be 1, i.e., wherein no correction is performed. In this case 60 obtuse triangular elements were found. FIG. 5B shows a case wherein correction is made according to the embodiment and $\alpha = 0.1$. In this case, it was confirmed that the number of obtuse triangular elements was decreased to 26.

Figure 6:
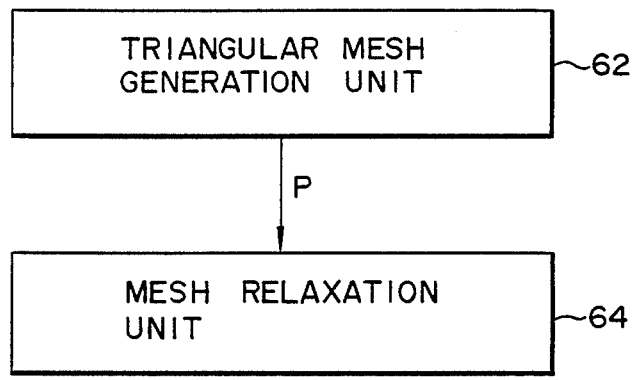
FIG. 6 is a block diagram of a triangular mesh generation method according to a second embodiment of the present invention.

FIG. 6 is a block diagram of a second embodiment. The second embodiment comprises triangular mesh generation unit 62 and mesh relaxation unit 64. Mesh generation unit 62 may generate a triangular mesh using any known method or using the generation method described in the first embodiment. That is, mesh generation unit 62 is only required to generate data about nodes of triangular elements, and therefore it may be a simple data input section instead of a data generation unit. The second embodiment is characterized in that the shape of the triangular elements is relaxed by correcting the positions of nodes upon generation of triangular elements.

Figure 7:
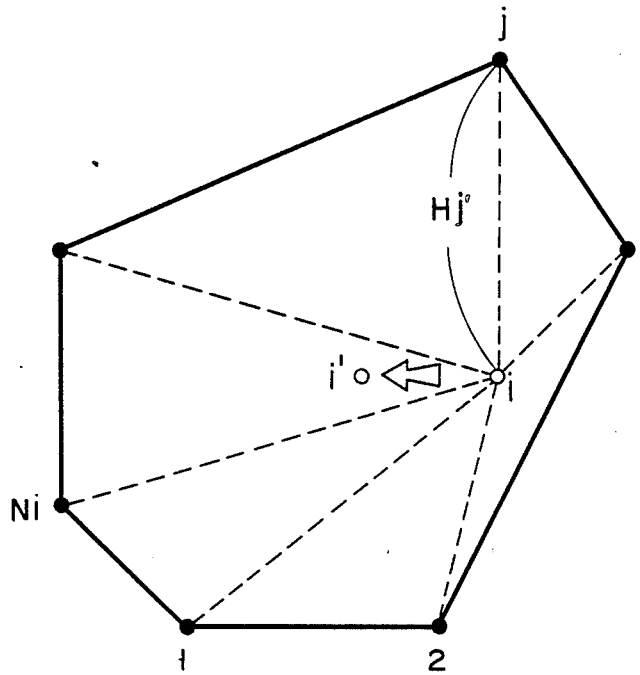
FIG. 7 is a view for explaining a principle of generation of triangular elements according to the second embodiment.
Figure 8:
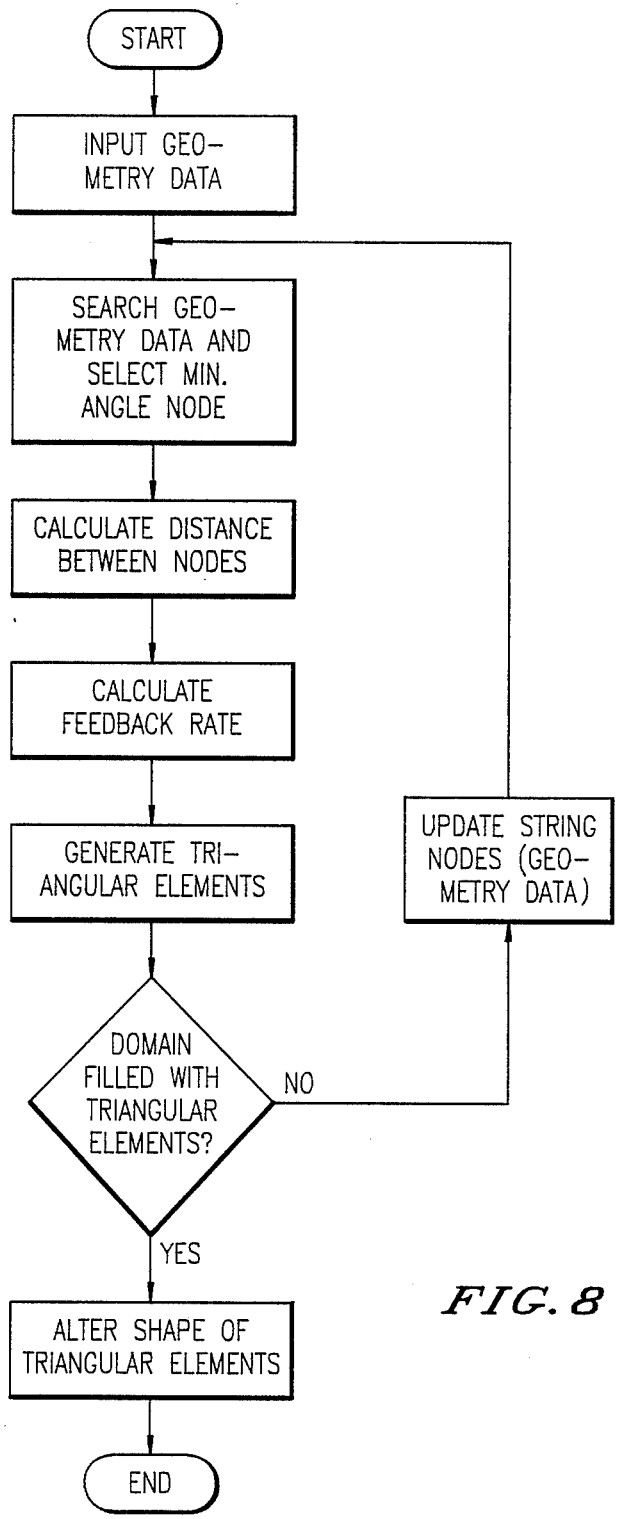
FIG. 8 is a flowchart of the method of this invention.

As shown in FIG. 7, mesh relaxation unit 64 corrects the position (coordinates) of each node in accordance with the distance between that node and each of the nodes surrounding that node and the positions of each of the nodes surrounding that node. Coordinates $P'_i$ of node i' obtained upon correction of node i are represented by $$P_i = \frac{\sum_{j=1}^{N_i} P_j \times H_j^\beta}{\sum_{j=1}^{N_i} H_j^\beta} \quad (2)$$

where $N_i$ is the total number of nodes surrounding node i, $H_j$ is the distance between nodes i and j, $P_j$ is the coordinates of adjacent node j, and $\beta$ is a parameter. When $\beta$ is 1, node $P'_i$ after correction becomes the center of gravity of its surrounding nodes. When coordinates $P'_i$ after the correction of node i are obtained in this manner, they are set as updated coordinates of node i, thereby sequentially correcting coordinates of each node.

Figure 5C:
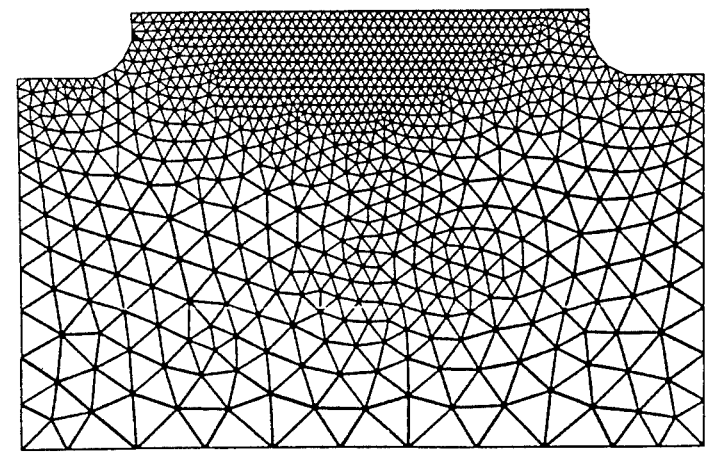

FIG. 5C shows the triangular mesh obtained by applying the relaxation processing of the second embodiment to the triangular elements obtained in the first embodiment in FIG. 5B. $\beta$ is set to be 0.5. In this case, only one obtuse triangular element was confirmed.

Thus, according to the second embodiment, the position of each node is moved while the lengths of the edges of its surrounding triangular elements are taken into consideration. Therefore, the shape of triangular elements can come closer to the regular triangle and the lengths of the respective edges can be made uniform, thereby preventing the generation of most obtuse triangular elements.

The second embodiment can be repeatedly applied to the triangular elements upon completion of one relaxation processing.

As has been described above, according to the present invention, there is provided a triangular mesh generation apparatus, in which the sizes of generated triangular elements are made uniform and the generation of most obtuse triangular elements is prevented even if the intervals of string nodes defining a generation domain greatly vary. In addition, there is provided a triangular mesh generation apparatus, in which a triangular element is relaxed by moving the position of a given node in accordance with the positions of its surrounding nodes and the distances between the given node and its surrounding nodes, thereby obtaining uniform triangular elements. Therefore, according to the present invention, high-precision, high-speed numerical analysis can be performed by the finite-element method or the finite-difference method.

The present invention is not limited to the above embodiments, but various changes and modifications can be made. Although in the first embodiment, the feedback rate calculation unit uses an arithmetic mean value, a geometric mean value may be used. In this case, feedback rate $r'_i$ is expressed as follows.

$$r'_i = \left( \frac{\sqrt{d_{i-1} \times d_i}}{\sqrt[N]{\prod_{k=1}^{N} d_k}} \right)^{-\alpha} \quad (3)$$

In addition, the values of $\alpha$ and $\beta$ are not limited to the above values, but can be variously changed in accordance with a shape of a generation domain. Furthermore, the second embodiment may be independently used, and may be combined with the first embodiment. In the latter case, more uniform triangular elements can be generated.

What is claimed is:

1. A method for generating a triangular mesh formed of triangular elements within a domain of interest to be analyzed, the domain being surrounded by topography string nodes with the triangular mesh discretizing an equation defined in the domain, comprising:

a first step of inputting geometry data denoting coordinates of said topography string nodes;

a second step of selecting a node having a minimum internal boundary angle among the topography string nodes by searching said geometry data;

a third step of calculating the distances between the selected node and two nodes adjacent to the selected node and the distance between pairs of adjacent nodes for all of said topographic nodes;

a fourth step of calculating a feedback rate which is defined by a ratio of a mean value of the distances between the selected node and two nodes adjacent to the selected node to a mean value of the distance between pairs of adjacent nodes for all said topography nodes;

a fifth step of generating by way of a computer a triangular element in accordance with the minimum internal boundary angle by using the feedback rate; and a sixth step of updating the topography string nodes by a computer, by eliminating the generated triangular elements.

2. The method according to claim 1, in which said fourth step comprises a step of calculating the feedback rate r from the following relationship:

$$r = \left( \frac{d_{i-1} + d_i/2}{(1/N) \sum_{k=1}^{N} d_k} \right)^{-\alpha}$$

where N is a total number of string nodes, $d_k$ is a distance between the adjacent nodes of the respective string nodes, $d_{i-1}$ and $d_i$ are distances between the selected node and two adjacent nodes, and $\alpha$ is a positive parameter; and in which said fifth step comprises a step of generating the triangular element as follows:

(1) when the minimum internal boundary angle $\theta \leq 90°$ a triangular element is generated by the selected node and two adjacent nodes thereof, (2) when $90° < \theta \leq 150°$ new node 1 is obtained on a line dividing internal boundary angle $\theta$ into two equal parts at distance l1 from the selected node, so that one triangular element is generated by node 1, the selected node, and one of the adjacent nodes, and another triangular element is generated by new node 1, the selected node, and the other of the adjacent nodes, where $l1 = r \times \sqrt{d_{i-1} \times d_i}$ and (3) when $150° < \theta \leq 180°$ new nodes 2 and 3 are respectively obtained on two lines dividing internal boundary angle $\theta$ into three equal parts at distances l2 and l3 from the selected node, so that one triangular element is generated by the selected node, one of the adjacent nodes, and new node 2, another triangular element is generated by the selected node and new nodes 2 and 3, and still another triangular element is generated by the selected node, the other of the adjacent node, and new node 3, where $l2 = r \times \sqrt[3]{d_{i-1}^2 \times d_i}$ and $l3 = r \times \sqrt[3]{d_{i-1} \times d_i^2}$ 3. The method according to claim 1, in which said fourth step comprises a step of calculating the feedback rate r from the following relationship:

$$r = \left( \frac{d_{i-1} + d_i}{\sqrt[N]{\prod_{k=1}^{N} d_k}} \right)^{-\alpha}$$

where N is a total number of string nodes, $d_k$ is a distance between the respective adjacent nodes of the string nodes, $d_{i-1}$ and $d_i$ are distances between the selected node and the two adjacent nodes, and is a positive parameter; and in which said fifth step comprises a step of generating the triangular element as follows:

(1) when the minimum internal boundary angle $\theta \leq 90°$ a triangular element is generated by the selected node and two adjacent nodes thereof, (2) when $90° < \theta \leq 150°$ new node 1 is obtained on a line dividing internal boundary angle $\theta$ into two equal parts at distance l1 from the selected node, so that one triangular element is generated by node 1, the selected node, and one of the adjacent nodes, and another triangular element is generated by new node 1, the selected node, and the other of the adjacent nodes, where $l1 = r \times \sqrt{d_{i-1} \times d_i}$, and (3) when $150° < \theta \leq 180°$ new nodes 2 and 3 are respectively obtained on two lines dividing internal boundary angle $\theta$ into three equal parts at distances l2 and l3 from the selected node, so that one triangular element is generated by the selected node, one of the adjacent nodes, and new node 2, another triangular element is generated by the selected node and new nodes 2 and 3, and still another triangular element is generated by the selected node, the other of the adjacent nodes, and new node 3, where $l2 = r \times \sqrt[3]{d_{i-1}^2 \times d_i}$ and $l3 = r \times \sqrt[3]{d_{i-1} \times d_i^2}$ 4. The method according to claim 1, in which said first to sixth steps are repeated until the domain is filled with the triangular elements.

5. The method according to claim 1, which further comprises a seventh step of altering the shape of the triangular element generated at the fifth step by shifting the position of a given node included in the triangular element in accordance with the position of all nodes surrounding the given node and distances between each of the surrounding nodes and the given node.

6. The method according to claim 5, in which said seventh step comprises a step of shifting coordinates P of the given node and obtaining coordinates P' represented by $$P' = \frac{\sum_{j=1}^{N_i} P_j \times H_j^\beta}{\sum_{j=1}^{N_i} H_j^\beta}$$

where $N_i$ is a total number of nodes surrounding the given node, $H_j$ is a distance between the given node and surrounding node j, $P_j$ represents coordinates of the surrounding node j, and $\beta$ is a positive parameter.

7. The method according to claim 6, in which said first to seventh steps are repeated until the domain is filled with the triangular elements.

8. A method for generating a triangular mesh formed of triangular elements within a domain of interest to be analyzed, the domain being surrounded by topography string nodes with the triangular mesh discretizing an equation defined in the domain, comprising:

a first step of inputting geometrical data denoting coordinates of said topography string nodes;

a second step of selecting a node having a minimum internal boundary angle among the topography string nodes;

a third step of calculating the distance between the selected node and two nodes adjacent to the selected node and the distance between pairs of adjacent nodes for all of said topographic nodes;

a fourth step of generating by way of a computer a triangular element including the selected node in accordance with the minimum internal boundary angle;

a fifth step of altering the shape of the triangular element generated at the third step by shifting the position of a given node included in the triangular element in accordance with the position of all nodes surrounding the given node and distances between each of the surrounding nodes and the given node; and a sixth step of updating the domain by eliminating the generated triangular element.

9. The method according to claim 8, in which said fifth step comprises a step of shifting coordinates P of the given node and obtaining coordinates P' represented by $$P' = \frac{\sum_{j=1}^{N_i} P_j \times H_j^\beta}{\sum_{j=1}^{N_i} H_j^\beta}$$

where $N_i$ is a total number of nodes surrounding the given node, $H_j$ is a distance between the given node and surrounding node j, $P_j$ is coordinates of the surrounding node j, and $\beta$ is a positive parameter.

10. The method according to claim 8, in which said first to sixth steps are repeated until the domain is filled with the triangular elements.

11. The method according to claim 8, in which said fourth step comprises:

a step of calculating the feedback rate r from the following relationship:

$$r = \left( \frac{d_{i-1} + d_i/2}{(1/N) \sum_{k=1}^{N} d_k} \right)^{-\alpha}$$

where N is a total number of string nodes, $d_k$ is a distance between the adjacent nodes of the respective string nodes, $d_{i-1}$ and $d_i$ are distances between the selected node and two adjacent nodes, and $\alpha$ is a positive parameter; and in which said fifth step comprises a step of generating the triangular element as follows:

(1) when the minimum internal boundary angle $\theta \leq 90°$ a triangular element is generated by the selected node and two adjacent nodes thereof, (2) when $90° < \theta \leq 150°$ new node 1 is obtained on a line dividing internal boundary angle $\theta$ into two equal parts at distance l1 from the given node, so that one triangular element is generated by node 1, the selected node, and one of the adjacent nodes, and another triangular element is generated by new node 1, the selected node, and the other of the adjacent nodes, where $l1 = r \times \sqrt{d_{i-1} \times d_i}$ and (3) when $150° < \theta \leq 180°$ new nodes 2 and 3 are respectively obtained on two lines dividing internal boundary angle $\theta$ into three equal parts at distances l2 and l3 from the selected node, so that one triangular element is generated by the given node, one of the adjacent nodes, and new node 2, another triangular element is generated by the selected node and new nodes 2 and 3, and still another triangular element is generated by the selected node, the other of the adjacent node, and new node 3, where $l2 = r \times \sqrt[3]{d_{i-1}^2 \times d_i}$ and $l3 = r \times \sqrt[3]{d_{i-1} \times d_i^2}$ 12. A method according to claim 8, in which said fourth step comprises a step of calculating the feedback rate r from the following relationship:

$$r = \left( \frac{d_{i-1} \times d_i}{\sqrt[N]{\prod_{k=1}^{N} d_k}} \right)^{-\alpha}$$

where N is a total number of string nodes, $d_k$ is a distance between the respective adjacent nodes of the string nodes, $d_{i-1}$ and $d_i$ are distances between the selected node and the two adjacent nodes, and $\alpha$ is a positive parameter; and in which said fifth step comprises a step of generating the triangular element as follows:

(1) when the minimum internal boundary angle $\theta \leq 90°$ a triangular element is generated by the selected node and two adjacent nodes thereof, (2) when $90° < \theta \leq 150°$ new node 1 is obtained on a line dividing internal boundary angle $\theta$ into two equal parts at distance l from the selected node, so that one triangular element is generated by node 1, the selected node, and one of the adjacent nodes, and another triangular element is generated by new node 1, the selected node, and the other of the adjacent nodes, where $l1 = r \times \sqrt{d_{i-1} \times d_i}$ and (3) when $150° < \theta \leq 180°$ new nodes 2 and 3 are respectively obtained on two lines dividing internal boundary angle $\theta$ into three equal parts at distances l2 and l3 from the selected node, so that one triangular element is generated by the selected node, one of the adjacent nodes, and new node 2, another triangular element is generated by the selected node and new nodes 2 and 3, and still another triangular element is generated by the selected node, the other of the adjacent nodes, and new node 3, where $l2 = r \times \sqrt[3]{d_{i-1}^2 \times d_i}$ and $l3 = r \times \sqrt[3]{d_{i-1} \times d_i^2}$ 13. A method for generating a triangular mesh formed of triangular elements within a domain of interest to be analyzed, the domain being surrounded by topography string nodes with the triangular mesh discretizing an equation defined in the domain, comprising:

a first step of inputting geometry data denoting coordinates of said topography string nodes;

a second step of selecting a node having a minimum internal boundary angle among the topography string nodes by searching said geometry data;

a third step of calculating the distance between the selected node and the two nodes adjacent to the selected node and the distance between pairs of adjacent nodes for all of said topographic nodes;

a fourth step of calculating a feedback rate which is defined by a ratio of a mean value of the distances between the selected node and two nodes adjacent to the selected node to a mean value of the distance between pairs of adjacent nodes for all said topography nodes;
a fifth step of generating by way of a computer a triangular element in accordance with the minimum internal boundary angle by using the feedback rate;
a sixth step of updating the topography string nodes by eliminating the generated triangular element; and
a seventh step of repeating said first to sixth steps until the domain is filled with the triangular elements, during the first step which is repeated the updated topography string nodes being inputted.

* * * * *